(No Model.)
C. McK. INGERSOLL.
RAILROAD CLEANING TOOL.
No. 368,213. Patented Aug. 16, 1887.
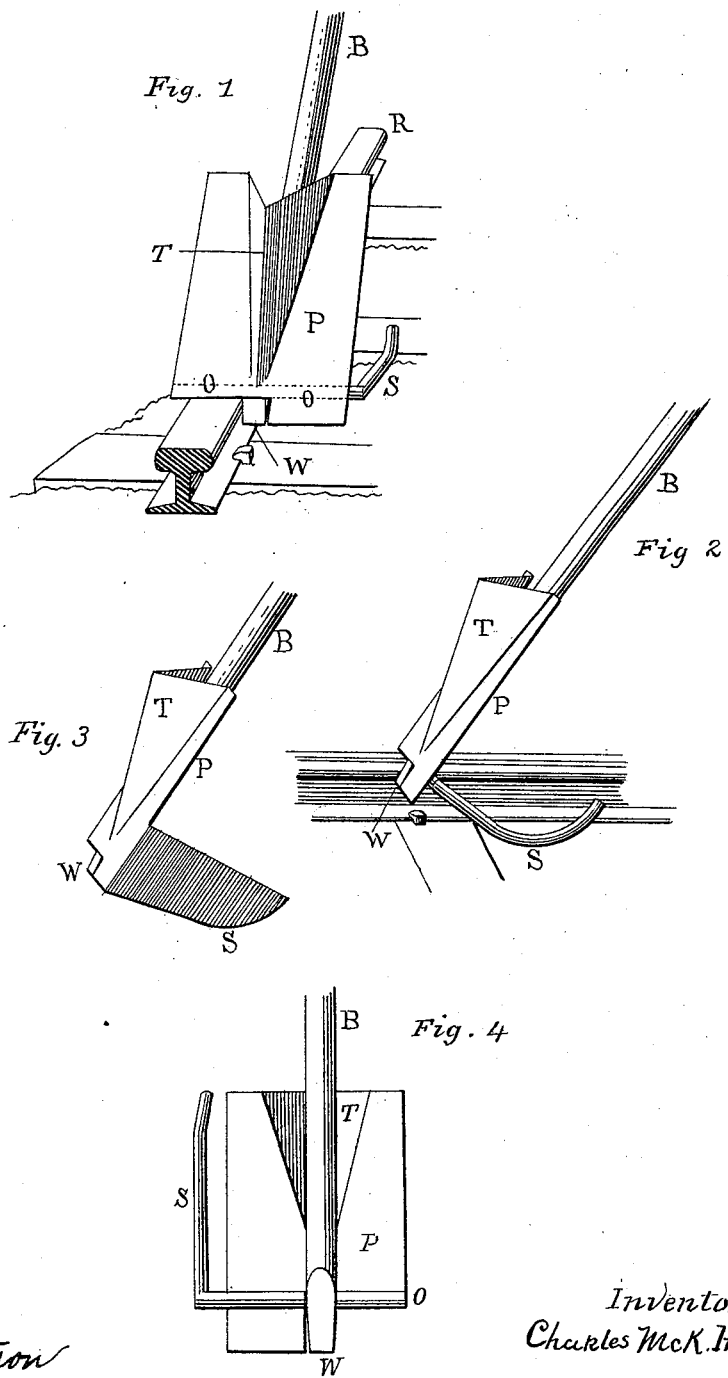
Witnesses
A. L. Watson
Edward J. Luck
Inventor
Charles McK. Ingersoll
by his attorney
H. H. Copeland

UNITED STATES PATENT OFFICE.

CHARLES McK. INGERSOLL, OF RUTHERFORD, NEW JERSEY.

RAILROAD-CLEANING TOOL.

SPECIFICATION forming part of Letters Patent No. 368,213, dated August 16, 1887.

Application filed May 19, 1887. Serial No. 238,800. (No model.)

*To all whom it may concern:*

Be it known that I, CHARLES MCKINSTRY INGERSOLL, of Rutherford, Bergen county, New Jersey, have invented a new and useful device—viz., a Railroad Cleaner or Tool—of which the following is a specification.

The object of my said device is a tool by which to remove from railroad tracks dirt, snow, ice, or other matter more easily, more quickly, and more economically than has hitherto been done.

The construction and operation of my device are as follows, reference being had to the accompanying drawings, which are hereby made part of this specification.

In said drawings, Figure 1 is a front view in perspective of my said device, showing its application to the rail of a railway. In said figure, B is a bar. P is a plate formed as a shovel or plow, with a ridge, as shown at T, to facilitate the removal of dirt, snow, ice, or other matter, said plate being made to project down even with the point W on one side thereof. S is a support or runner, made by prolonging the cross-bar (shown at O in Fig. 4 and indicated by the dotted lines *o o* in Fig. 1) and bending it, as shown more clearly in Fig. 2 at S. Said supporter or runner may also be made in the form and manner shown at S in Fig. 3.

Figs. 2 and 3 are perspective views showing more clearly the construction and purpose of said support or runner.

Fig. 4 is a view of the under side of the said device, showing the bar B, the under side of said plate, the cross-bar O, and the point W. The bar B may be joined or fastened to said plate by any suitable means ordinarily in use. The cross-bar O is firmly secured to said plate. O is a cross-bar firmly secured to the plate P and the point W, thereby strengthening said plate and forming a strong scraping-edge. One end of it also, by being extended and bent properly, serves as a runner or supporter. Both these functions of the cross-bar are material and important, and constitute a novel and highly important improvement over any forms heretofore used in tools similar in purpose to the device for which this application is now made.

The device is used as follows, viz: The plate is placed on the rail of a track, as shown in Figs. 1 and 2, and pushed along said rail, being at the same time held firmly down and against the top and side of the rail, so that the point and cross-bar and the edge of the plate may scrape off from the track the dirt or other matter to be removed therefrom.

The purpose of the support or runner S is to keep the plate, as well as the point W, squarely against the rail while the tool is being shoved along, as aforesaid. It is a material part of my device that the edge of the plate on one side thereof is made even with the point W, as shown in Fig. 1, as I so construct it for the purpose of removing dirt and other like matter lying next to the rail, the removal of that lying on or against the rail being more properly the function of the other parts of the device.

In the figures shown herein the plate is a plane surface, except the raised portion shown at T; but it is immaterial whether said plate should be plane, curved, or otherwise shaped.

Said tool here shown and described is especially intended for railroad grades and curves.

Having shown and explained my device, what I claim as my invention is—

1. The combination, in one tool for cleaning railroad-tracks, of a bar, cross-bar, and plate so combined that the edge of said plate next adjacent to the point of said bar shall on one side extend even with said point and on the other shall not extend so far as said point, all substantially as set forth.

2. The combination, in one tool for cleaning railroad-tracks, of a bar, cross-bar, and plate so combined that the edge of said plate next adjacent to the point of said bar shall on one side extend even with said point and on the other shall not extend so far as said point, together with a supporter or runner, all substantially as set forth and described.

CHAS. McK. INGERSOLL.

Witnesses;
H. H. COPELAND,
EDWARD J. LUCE.